United States Patent
Tosaki et al.

(10) Patent No.: US 6,603,732 B2
(45) Date of Patent: *Aug. 5, 2003

(54) RECORDABLE OPTICAL DISK

(75) Inventors: Yoshihiro Tosaki, Osaka (JP); Masaru Odagiri, Hyogo (JP); Hiromichi Shimada, Hyogo (JP); Shinichi Tanaka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,738

(22) Filed: Apr. 29, 2002

(65) Prior Publication Data

US 2002/0159361 A1 Oct. 31, 2002

Related U.S. Application Data

(63) Continuation of application No. 09/743,795, filed as application No. PCT/JP00/03228 on May 19, 2000.

(30) Foreign Application Priority Data

May 21, 1999 (JP) ............................................ 11-141888

(51) Int. Cl.[7] .................................................. G11B 7/24
(52) U.S. Cl. ................................ 369/275.3; 369/275.4; 369/53.21; 369/47.12
(58) Field of Search .......................... 369/47.12, 47.13, 369/47.55, 53.2–53.22, 53.37, 275.1–275.5; 713/176; 380/201; 386/105–106, 125–126

(56) References Cited

U.S. PATENT DOCUMENTS

| | | | |
|---|---|---|---|
| 4,972,399 A | 11/1990 | Miyasaka | |
| 5,060,219 A | 10/1991 | Lokhoff et al. | |
| 5,289,451 A | 2/1994 | Ashinuma et al. | |
| 5,418,764 A | 5/1995 | Roth et al. | |

(List continued on next page.)

FOREIGN PATENT DOCUMENTS

| | | |
|---|---|---|
| EP | 0342748 | 11/1989 |
| EP | 0487321 | 5/1992 |
| EP | 0642121 | 3/1995 |
| EP | 0706174 | 4/1996 |

(List continued on next page.)

OTHER PUBLICATIONS

English Language Abstract of JP 10–31222, 2000.
English Language Abstract of JP 2000–149415, 2000.
English Language Abstract of JP 9–81938, 1997.
English Language Abstract of JP 2–5111.

*Primary Examiner*—W. R. Young
(74) *Attorney, Agent, or Firm*—Greenblum & Bernstein, P.L.C.

(57) ABSTRACT

A DVD-R 1 has a main information area 2 where data information is recorded in a track having a wobble, and first and second control data areas 3,15 each of which is disposed in an inner space closer to the disk center than the main information area 2. The information structure and physical structure of the first control area 3 are different from those of the second control area 15. In the second control area 15, predetermined physical format information and disk production information, for example, the last address of when data is written in the DVD-R 1, the maximum transfer rate or the like, are recorded. Thus, when the DVD-R 1 is reproduced by a DVD player etc., the physical format information and disk production information etc. recorded in the second control data area 15 are read. Thereby, the disk can be precisely identified without spoiling the physical format information, the disk production information or the like, and further illegal use of the DVD or another optical disk leading up to breach of the copyright can be effectively prevented.

12 Claims, 5 Drawing Sheets

U.S. PATENT DOCUMENTS

| | | |
|---|---|---|
| 5,473,584 A | 12/1995 | Oshima |
| 5,537,373 A | 7/1996 | Horikiri |
| 5,654,947 A | 8/1997 | Roth et al. |
| 5,661,703 A | 8/1997 | Moribe et al. |
| 5,699,331 A | 12/1997 | Oshima |
| 5,737,286 A | 4/1998 | Timmermans et al. |
| 5,764,610 A | 6/1998 | Yoshida et al. |
| 5,802,174 A | 9/1998 | Sako et al. |
| 5,805,551 A | 9/1998 | Oshima et al. |
| 5,807,649 A | 9/1998 | Liebmann |
| 5,818,812 A | 10/1998 | Moribe et al. |
| 5,856,958 A | 1/1999 | Yokota et al. |
| 5,878,020 A | 3/1999 | Takahashi |
| 5,881,038 A | 3/1999 | Oshima et al. |
| 5,917,910 A | 6/1999 | Ishiguro et al. |
| 5,926,453 A | 7/1999 | Muramatsu et al. |
| 5,959,948 A | 9/1999 | Oshima |
| 6,031,815 A | 2/2000 | Heemskerk |
| 6,163,521 A | 12/2000 | Konishi et al. |
| 6,285,638 B1 | 9/2001 | Konishi et al. |
| 6,301,663 B1 * | 10/2001 | Kato et al. .................. 713/176 |
| 6,414,922 B1 * | 7/2002 | Akiyama et al. .... 369/47.55 X |

FOREIGN PATENT DOCUMENTS

| | | |
|---|---|---|
| EP | 0751503 | 1/1997 |
| EP | 0798711 | 10/1997 |
| EP | 0807929 | 11/1997 |
| EP | 1067544 | 1/2001 |
| EP | 1102248 | 5/2001 |
| EP | 1102249 | 5/2001 |
| JP | 2-5111 | 1/1990 |
| JP | 9-81938 | 3/1997 |
| JP | 10-31222 | 2/1998 |
| JP | 2000-149415 | 5/2000 |
| WO | 97/50081 | 12/1997 |
| WO | 98/47135 | 10/1998 |
| WO | 00/07182 | 2/2000 |
| WO | 00/07183 | 2/2000 |
| WO | 00/26912 | 5/2000 |

* cited by examiner

RECORDABLE OPTICAL DISK

CROSS-REFERENCE TO RELATED APPLICATION

This is a continuation of U.S. application Ser. No. 09/743,795, filed on Mar. 22, 2001, pending which was the National Phase of International Application No. PCT/JP00/03228, filed May 19, 2000, the contents of which are expressly incorporated by reference herein in their entireties. The International Application was not published under PCT Article 21(2) in English.

TECHNICAL FIELD

The present invention relates to an optical disk, and a recording/reproducing apparatus and a recording method, for the optical disk, in particular, relates to a circular optical disk in which record signals such as images or voices are ciphered and recorded in order to protect literary properties from illegal copies thereof, and to an apparatus for and a method of reproducing and/or recording the record signals from/to the optical disk.

BACKGROUND ART

In general, in a DVD (Digital Versatile Disk) on the market, in which a movie, music or the like is collected (recorded), data information such as an image, voice or the like is ciphered and recorded in order to protect literary properties from illegal copies thereof, namely in order to protect the copyright thereof. Thus, when the DVD is reproduced using a DVD reproducing apparatus, the DVD reproducing apparatus reproduces it by reading key information recorded in a control data area of the DVD, and deciphering the ciphered data information using the key information to reconstruct the original image voice or the like.

Hereinafter, a conventional DVD and a DVD reproducing apparatus of the above-mentioned type will be concretely described. Hereupon, a DVR-R (i.e. write-once DVD), which is an example of the DVD, will be described.

FIG. 4 is a perspective view showing a rough construction of a conventional DVD-R. In FIG. 4, 101 denotes a DVD-R. 102 denotes a main information area of the DVD-R 101. Data information such as an image, voice or the like is generally ciphered and recorded in the main information area 102. 103 denotes a control data area. The control data area 103 records disk production information and physical format information including key information for deciphering the data information recorded in the main information area 102. Hereupon, the control data area 103 is located at a position of the inner periphery side in the DVD-R 101. In the DVD-R 101, a spiral groove with a wobble is formed from the inner periphery side to the outer periphery side over the both areas 102,103. Thus, the data information is recorded in the recording layer of the groove. Hereupon, the address information, the disk recording condition or the like has been previously recorded on the substrate in the form of an inter-groove pre-pit.

FIG. 5 is a block diagram showing a rough construction of a conventional DVD reproducing apparatus. In FIG. 5, 101 denotes the DVD 101. The DVD 101 records the data information such as an image or voice to be reproduced. 104 denotes an optical pickup. The optical pickup 104 reads record signals of the DVD 101 using laser rays. 105 denotes a transfer controller. The transfer controller 105 moves the optical pickup 104 in the radial direction of the DVD 101 in order to read the record signals at arbitrary positions on the DVD 101. 106 denotes a disk motor. The disk motor 106 rotates the DVD 101.

107 denotes a first control circuit. The first control circuit 107 controls the optical pickup 104, the transfer controller 105 and the disk motor 106. 108 denotes an amplifier. The amplifier 108 amplifies the signals, which have been read by the optical pickup 104. 109 denotes a second control circuit. The output signals of the amplifier 108 are inputted into the second control circuit 109. Based on the signals, the second control circuit 109 generates servo signals such as focus error signals, tracking error signals or the like, which are required when the optical pickup 104 reads the record signals of the DVD 101, and then outputs them to the first control circuit 107. Meanwhile, the second control circuit 109 digitizes (makes binary) the input signals of analog type.

110 denotes a demodulation circuit. The demodulation circuit 110 analyzes the signals, which have been read from the DVD 101 to be digitized, while it reconstructs the data information such as the original image or music. 111 denotes a system control circuit. The system control circuit 111 wholly controls the DVD reproducing apparatus.

Hereinafter, actions of the DVD reproducing apparatus having the above-mentioned construction will be described. When the DVD 101 on the market is reproduced, at first, the first control circuit 107 drives and controls the transfer controller 105 in accordance with the instruction of the system control circuit 111. As the result, the transfer controller 105 moves the optical pickup 104 to a position of an inner periphery side in the DVD 101. The signals, which have been read by the optical pickup 104, are amplified by the amplifier 108, and then digitized by the second control circuit 109. The demodulation circuit 110 reads the contents of the digital signals, and then sends the results to the system control circuit 111. If the read contents do not include the key information in the control data area 103 (see FIG. 4), the system control circuit 111 outputs another instruction to the first control circuit 107 again, and then causes the first control circuit 107 to drive and control the transfer controller 105. As the result, the transfer controller 105 moves the optical pickup 104 to a further inner position of the inner periphery side in the DVD 101, and then searches the key information of the DVD 101.

The key information, which has beer recorded in the control data area 103 located at a position of the inner periphery side in the DVD 101, is found out by repeating the above-mentioned actions. Then the demodulation circuit 110 reads the key information. If the system control circuit 111 detects that the demodulation circuit 110 has read the key information of the DVD 101, the first control circuit 107 drives and controls the transfer controller 105 in accordance with the instruction of the system control circuit 111. As the result, the transfer controller 105 moves the optical pickup 104 to a position of he outer periphery side in the DVD 101. Then the optical pickup 104 reads the data information recorded in the main information area 102 of the DVD 101 (see FIG. 4). Because the data information is generally ciphered, normal image or voice signals cannot be obtained if the data information is simply reproduced. However, the data information can be deciphered if the key information, which was recorded in the control data region 103 and has been previously read, is used. Thus, the demodulation circuit 110 deciphers the data information in the main information area 102 using the key information, which has been read, so as to reconstruct the original and normal image data or voice data.

However, in the writable optical disk such as a DVD-R or the like, there may be such a problem that a copy of the optical disk may be easily produced by copying the information in the control data area as well as the data information into the DVD-R, even if the data information is ciphered as described above. Thus, in order to physically prevent the information in the control data area from being copied as described above, there has been proposed such a procedure as to previously record other signals at least into the region, in which the key information of the DVD-R is to be recorded, so as to prevent the key information from being copied into the region. That is such a procedure as to prevent the normal key information from being reproduced by the reproducing apparatus by previously forming pre-nits with other information, for example by forming embossment in the control data area including the region in which the key information of the DVD-R is to be recorded, so as to destroy the normal key information.

However, in the conventional optical disk and the reproducing or recording system thereof as described above, it is impossible to record the physical format information and disk production information such as last address information etc of the writing region, into which data must be written later, into the control data area 103, when the data is recorded into the main information area 102. Thus, if the DVD-R 1 (optical disk), in which the above-mentioned physical format information and disk production information are not recorded into the control data area 103, is reproduced by the DVD-ROM reproducing apparatus, there may occur such a problem that various useful functions, for example the function for detecting the disk volume in a short time to indicate it, are spoiled. Further, there may occur also such a problem that the responsibility associated with the recorded positioning information is deteriorated. In addition, if embossment having stronger restraint for the illegal use is previously formed in the region including the key information of the control data area 103 as the recording pit, it may be extremely difficult to form a wobble in the region. In consequence, if the DVD is reproduced using the DVD reproducing apparatus, there occurs such a problem that it may be accidentally judged that the DVD is a DVD-ROM though it is practically a DVD-R, because no wobble exists in the region.

DISCLOSURE OF INVENTION

The present invention is achieved to solve the conventional problems described above. Thus, it has an object to provide an optical disk and an apparatus for and method of recording or reproducing the optical disk, which can precisely identify the type of the optical disk and can effectively prevent the illegal use of the optical disk such as a DVD or the like, which infringes the copyright, without spoiling the functions for recording or reproducing the physical format information, the disk production information (disk control information) and so on.

An optical disk according to the first aspect of the present invention which has been achieved to solve the above-mentioned problems, including (i) a main information area in which ciphered data information can be recorded in a recording layer of a groove having a wobble in such a manner that the data information can he read using light, (ii) a first control data area located at an inner periphery side in comparison with the main information area, and (iii) a second control data area located at an inner periphery side in comparison with the main information area, the second control data area being able to record information with an information structure which is different from an information structure of the first control data area, is characterized in that (iv) the first control data area is provided with a region which can record disk production information and physical format information including key information for deciphering the data information, other information having been previously recorded in another region, which can record at least the key information, in the first control data area, and (v) the second control data area being able to record the disk production information and the physical format information which does not include the key information.

Further, another optical disk according to the second aspect of the present invention, including (i) a main information area in which ciphered data information can be recorded in a recording layer of a groove having a wobble in such a manner that the data information can be read using light, (ii) a first control data area located at an inner periphery side in comparison with the main information area, and (ii) a second control data area located at an inner periphery side in comparison with the main information area, the second control data area being able to record information with a physical structure which is different from a physical structure of the first control data area, is characterized in that (iv) the second control data area can record disk production information and physical format information which does not include key information for deciphering the data information.

In the optical disk according to the second aspect of the present invention, it is preferable that the physical structure is composed of a wobble, the first control data area being provided with no wobble, and the second control data area being provided with the wobble.

In the optical disk according to the first or second aspect of the present invention, a pit, which has recorded information including an address signal, may be provided at an inter-groove position in the second control data area.

Meanwhile, in the optical disk according to the first or second aspect of the present invention, a recording pit in the first control data area may be composed of embossment, while a recording pit in the second control data area may be formed by a laser light.

Hereupon, as an example of the optical disk according to the first or second aspect of the present invention, for example, a write-once optical disk is pointed out.

A recording/reproducing apparatus for an optical disk according to the third aspect of the present invention, including (i) a main information area in which ciphered data information can be recorded in a recording layer of a groove having a wobble, (ii) a first control data area which can record disk production information and physical format information including key information for deciphering the data information, and (iii) a second control data area, (iv) the apparatus being able to record and/or reproduce the data information, is characterized in that (v) the recording/reproducing apparatus can record or reproduce the disk production information and the physical format information without the key information into the second control data area, with a structure which is different from a structure of the first control data area, when the optical disk is recorded or reproduced, respectively.

Another recording/reproducing apparatus for an optical disk according to the fourth aspect of the present invention, including (i) a main information area in which ciphered data information can be recorded in a recording layer of a groove having a wobble, (ii) a first control data area which can record disk production information and physical format information including key information or deciphering the data information, and (iii) a second control data area, in which (iv) a structure of the first control data area and a structure of the second control data area are different from each other, the apparatus being able to record and/or reproduce the data information, is characterized in that (v) the recording/reproducing apparatus can record or read the disk production information and the physical format information without the key information using the second control data area, when the optical disk is recorded or reproduced, respectively.

In the recording/reproducing apparatus for the optical disk according to the third or fourth aspect of the present invention, the optical disk may be an optical disk in which information has been previously recorded at least in a portion of the first control data area.

Hereupon, as an example of the optical disk which is used in the recording/reproducing apparatus for the optical disk according to the third or fourth aspect of the present invention, for example, a write-once optical disk is pointed out.

A recording method for an optical disk according to the fifth aspect of the present invention, including (i) a main information area in which ciphered data information can be recorded in a recording layer of a groove having a wobble, (ii) a first control data area which can record disk production information and physical format information including key information for deciphering the data information, and (iii) a second control data area, the method being for recording the data information, is characterized in that the method includes the steps of (iv) detecting whether a loaded optical disk is writable or not, and (v) writing the disk production information and the physical format information without the key information into the second control data area, if the optical disk is writable.

In the recording method for the optical disk, it may be detected whether the loaded optical disk is writable or not, on the basis of whether a wobble exists or not.

In the optical disk, the recording/reproducing apparatus for recording and/or reproducing the optical disk or the recording method for the optical disk, according to the present invention, the disk can be precisely identified without spoiling the physical format information, the disk production information (disk control information) or the like. In addition, illegal use of a DVD or another optical disk leading up to breach of the copyright may be effectively prevented. Further, it may become possible to previously form a recording pit composed of embossment, which has stronger restraint for preventing the illegal use and can be formed with a lower cost. In consequence, the optical disk may be manufactured with a lower cost.

BEST MODE FOR CARRYING OUT THE INVENTION

Figure 1:
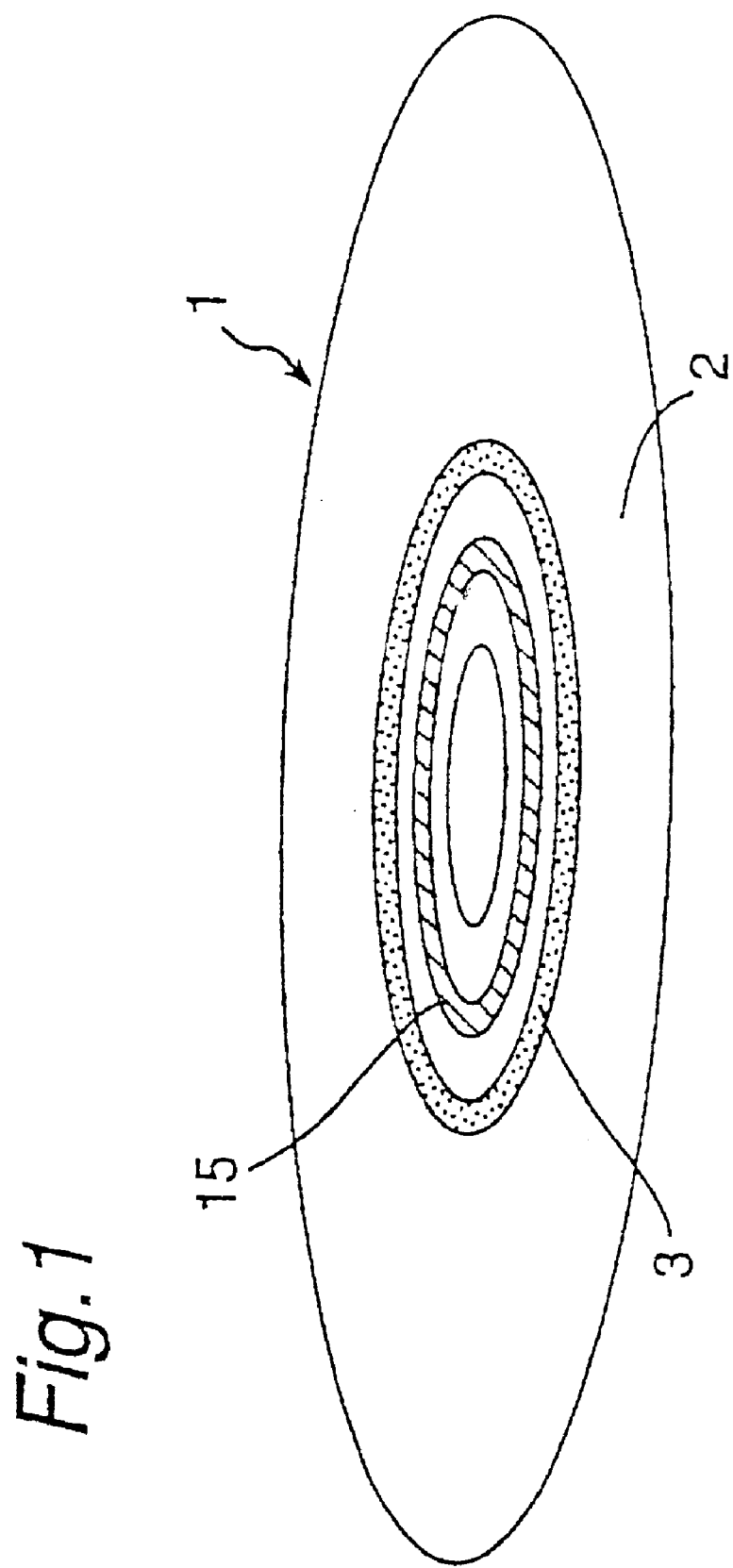
FIG. 1 is a perspective view showing a rough construction of a DVD-R according to the present invention.

An optical disk according to the present invention is provided with a main information area in which data information (main data) is recorded in a track having a wobble, and a first and a second control data areas each of which is located at an inner periphery position in comparison with the main information area. Hereupon, the information structures or physical structures of the first and second control data areas are different from each other. Thus, the first control data area has a region which can record disk production information (disk control information), physical format information including key information for deciphering the data information, and so on. In addition, the optical disk has such a function as to protect the copyright of the data information, by previously recording other information at least into the region within the first control data area, into which the key information is to be recorded. The recording action can be performed by forming embossment there, or writing it using a laser light. Further, the optical disk is additionally provided with a second control area for recording the disk production information, the physical format information without the key information, and so on. In consequence, the predetermined physical format information, the disk production information and so on, for example the maximum transfer rate or the last address into which data is to be recorded, can be recorded in the second control data area. Thus, when the optical disk is reproduced using a DVD reproducing apparatus or the like, the DVD reproducing apparatus or the like can be operated with a good responsibility by reading the physical format information and the disk production information in the second control data area.

Meanwhile, the ability for protecting the copyright may be further raised, if the disk production information and the physical format information without the key information etc. are recorded in the second control data area, and then the optical pickup is operated on the basis of the information which is read from the second control data area when the optical disk is reproduced. Hereupon, if the information structure of the second control data area is made be different from the information structure of the first control data area, it may become possible to easily identify the both of the two control data areas in a short time. Further, if the first control data area is composed of embossment or the like while the second control data area has such a structure that pits are formed at inter-groove positions so that the physical structures of the both areas are changed, the identification of the both control data areas may become easier. Thus, by reproducing or recording the physical format information such as a disk identifying condition or disk recording condition and disk production information etc. in the second control data area having the pits at the inter-groove positions thereof, it may be prevented that an erroneous identification or erroneous action occurs when the disk is identified.

A recording apparatus according to the present invention is provided with a pickup for reading record signals from the optical disk in which the key information for recording the data into the optical disk or deciphering the data is recorded in an inner periphery side position, a first control means which can move the pickup to an arbitrary position in the radius direction of the optical disk so as to read the data at the arbitrary position of the optical disk, a second control means for performing the reproducing operation for the ciphered data in the optical disk, a judging means for identifying the first control data area and the second control data area, and another control means for ciphering and structuring the data to record it. In the recording apparatus, the disk production information and the physical format information including the last address during the recording operation etc. is recorded at least into the second control data area of the DVD-R, the recording structure being different from that of the first control data area. Hereupon, the judging means for identifying the first control data area and the second control data area may be composed of a wobble detecting means which can identify the both areas on the basis of whether the wobble exists or not.

If the above-mentioned recording action is performed as an initialization when a non-recorded optical disk is recorded for the first time, and further if the data structure of each of the physical format information and the disk production information etc., each of which is recorded in the second control data area, is such one including no key information, it may become possible to read the physical format information and the disk production information etc. using the second control data area when the data is recorded or reproduced after that. Moreover, the function for protecting the copyright may be more strengthened, if the apparatus is additionally provided with a wobble detecting means for identifying whether the optical disk is writable, a protecting condition judging means into which reproduced signals are inputted, a disk judging means into which signals are inputted from the wobble detecting means, and an output inhibiting means for inhibiting the output of the reproducing or recording signals from the DVD if the result of the judgement of the protecting condition does not match with the result of the judgement of the disk.

A reproducing apparatus according to the present invention is provided with a pickup for reading record signals from the optical disk in which the key information for deciphering the data is recorded in an inner periphery side position, a first control means which can move the pickup to an arbitrary position in the radius direction or the optical disk so as to read the data at the arbitrary position of the optical disk, a second control means for performing the reproducing operation for the ciphered data in the optical disk, and a judging means for identifying the first control data area and the second control data area. The reproducing apparatus reads the physical format information and the disk production information in the second control data area in accordance with the resultant judgement of the judging means. Moreover, the function for protecting the copyright may be strengthened, if the apparatus is additionally provided with a wobble detecting means for identifying whether the optical disk is writable or not, a protecting condition judging means into which reproduced signals are inputted, a disk judging means into which signals are inputted from the wobble detecting means, and an output inhibiting means for inhibiting the output of the reproducing signals from the optical disk (DVD) if the result of the judgement of the protecting condition does not match with the result of the judgement of the disk.

Figure 2:
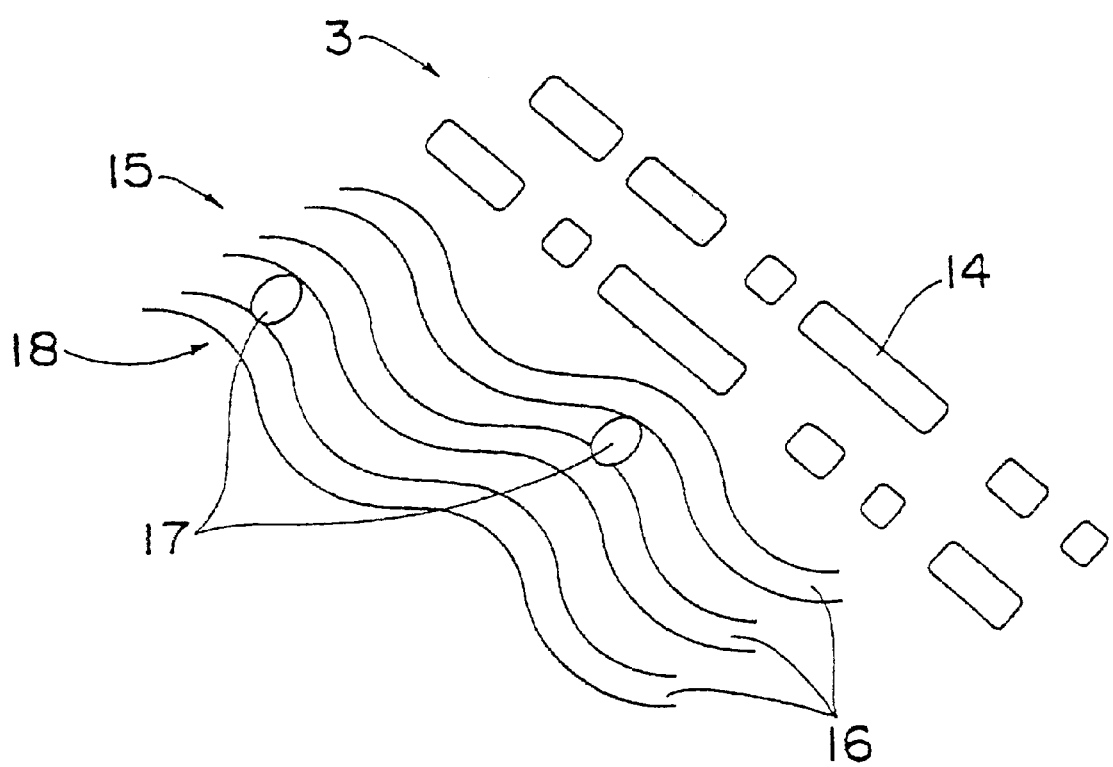
FIG. 2 is an enlarged schematic view showing the both of two control data areas of the DVD-R shown in FIG. 1.

Hereinafter, an embodiment of the present invention will be more concretely described with reference to FIGS. 1 to 3. FIG. 1 shows a rough construction of a DVD-R according to the present invention. FIG. 2 shows the first control data area composed of embossment or the like and the second control data area of the DVD-R shown in FIG. 1, each of the both areas being shown by an enlarged scale.

In FIG. 1, 1 denotes a DVD-R. 2 denotes a main information area into which ciphered data information may be recorded 3 denotes a first control data area for recording disk production information and physical format information including key information for deciphering the data. 15 denotes a second control data area for recording disk production information and physical format information, each of which has a structure which is different from that of the first control data area 3.

Meanwhile, in FIG. 2, 3 denotes the first control data area. 14 denotes pits, each of which is composed of embossment in the first control data area 3. 15 denotes the second control data area. 16 denotes grooves, while 17 denotes inter-groove pits for recording information such as addresses or disk recording conditions etc., each of the pits being formed between the grooves 16. Further, 18 denotes a wobble.

Figure 3:
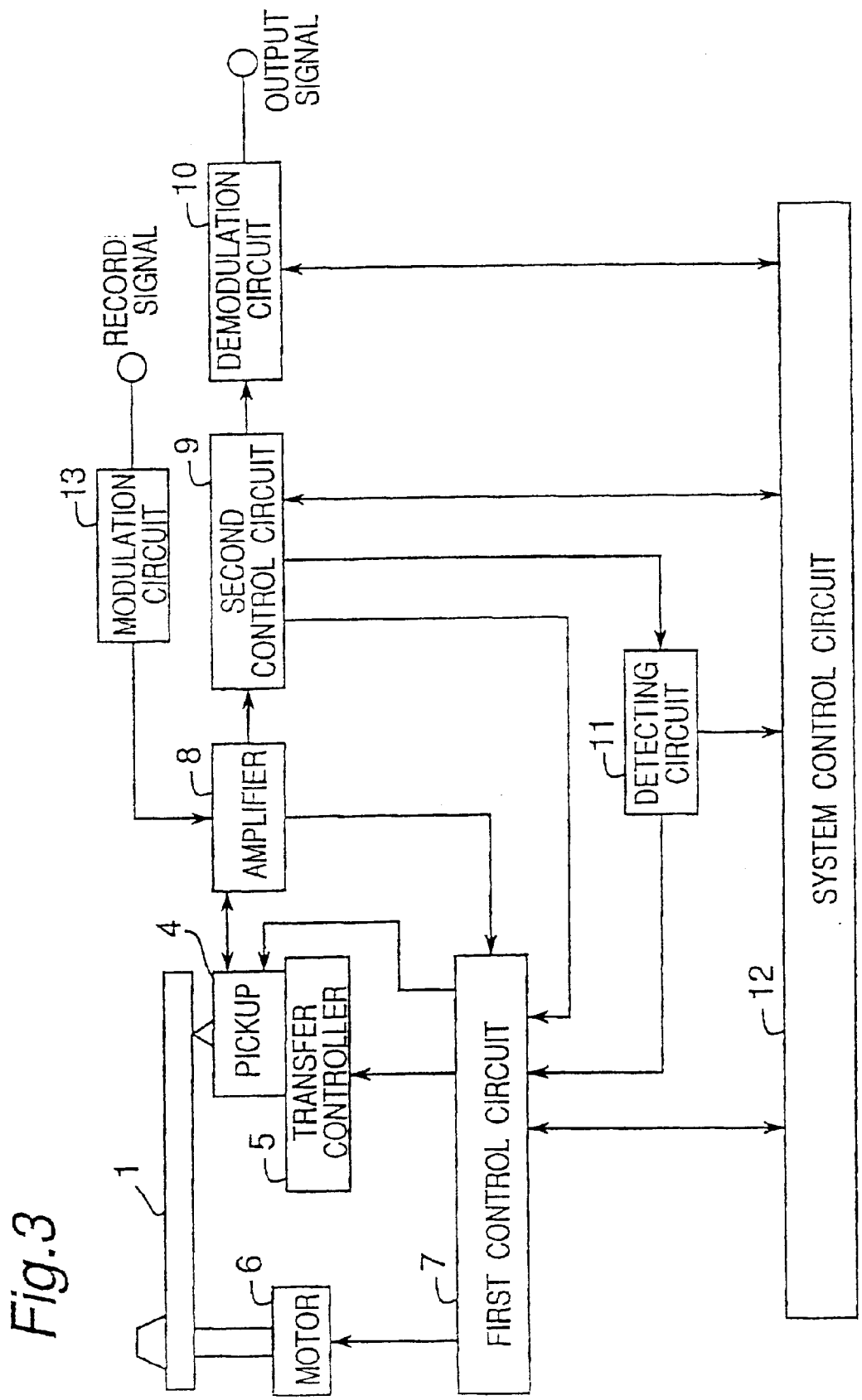
FIG. 3 is a block diagram showing a rough construction or a DVD recording/reproducing apparatus according to the present invention.
Figure 4:
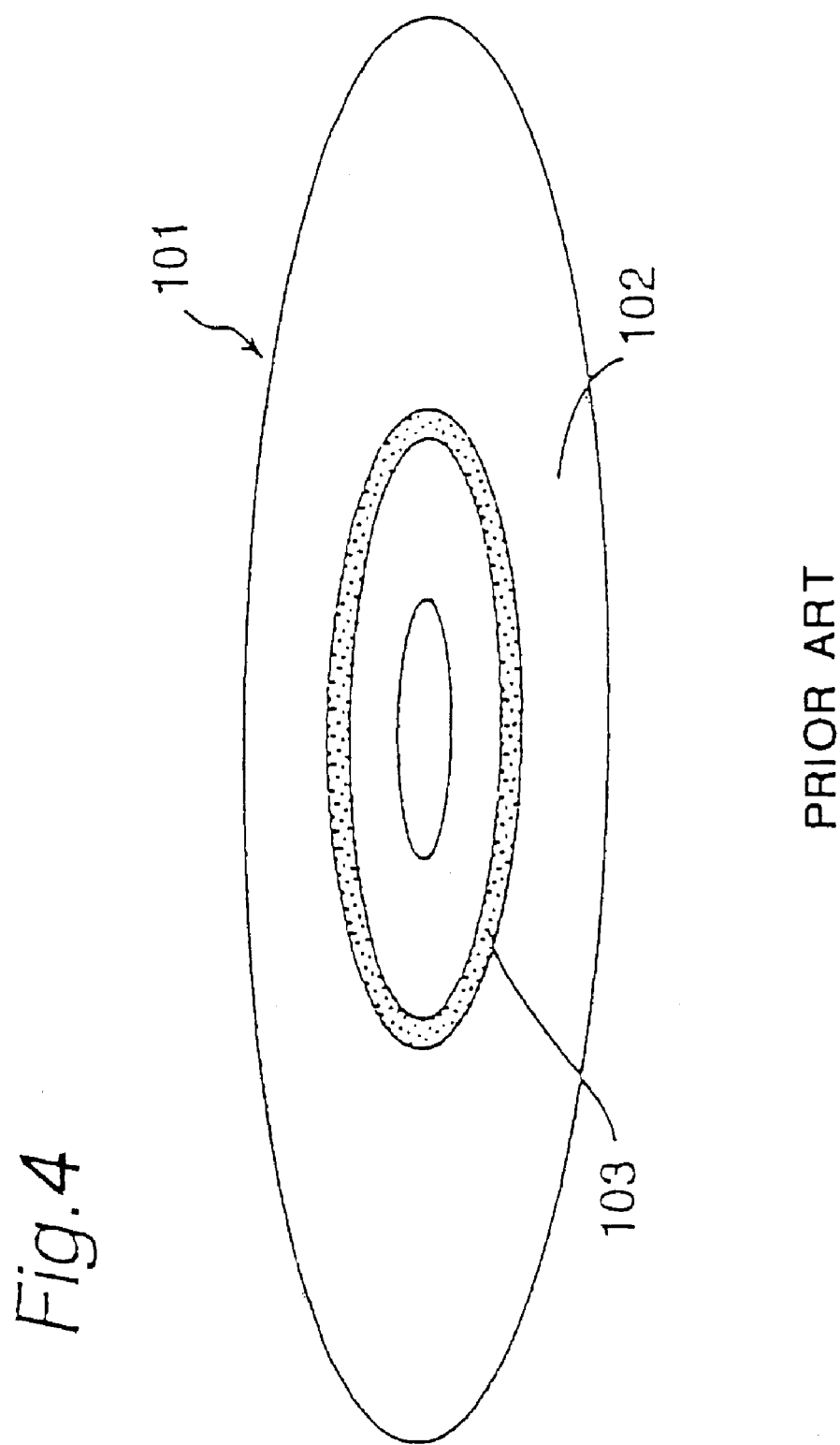
FIG. 4 is a perspective view showing a rough construction of a conventional DVD-R.
Figure 5:
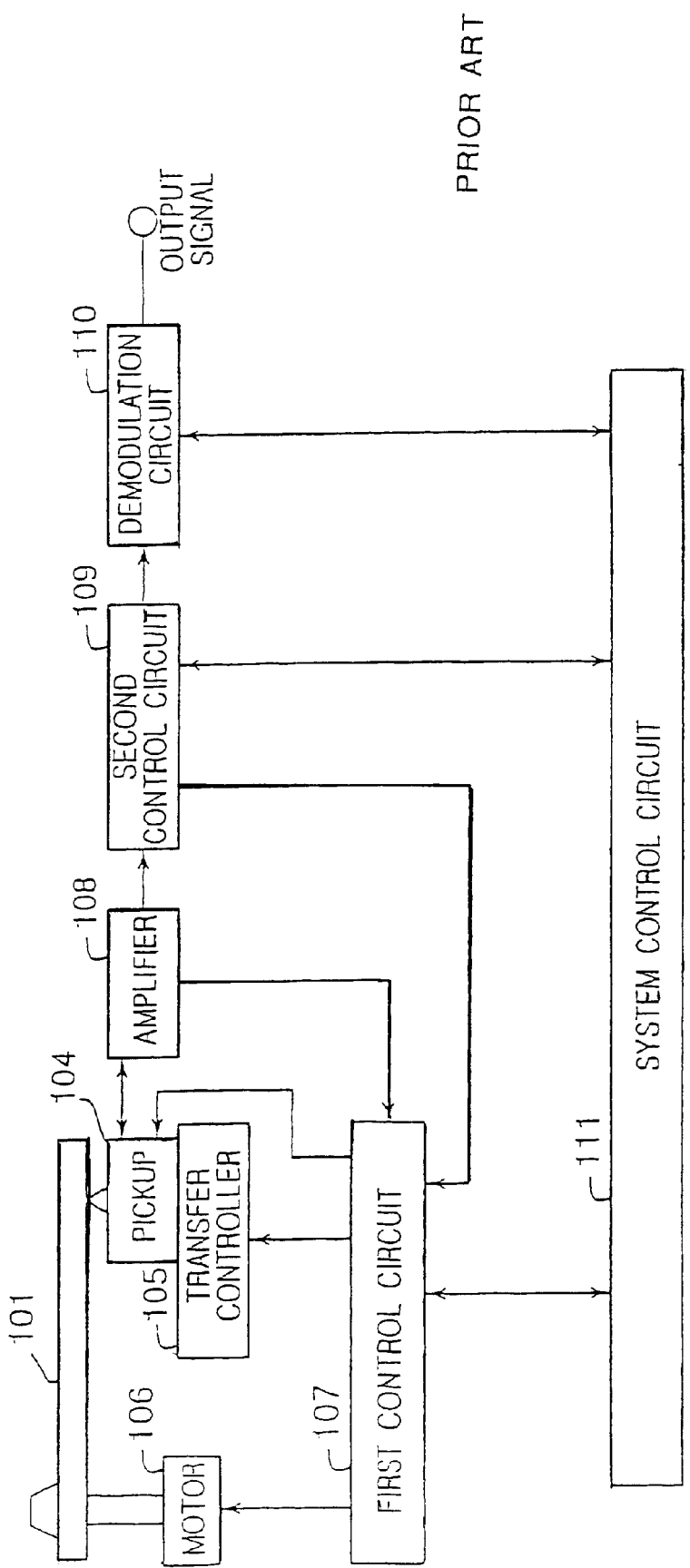
FIG. 5 is a block diagram showing a rough construction of a conventional DVD reproducing apparatus.

FIG. 3 is a block diagram of a DVD recording/reproducing apparatus according to the present invention. In FIG. 3, 1 denotes the DVD. In the DVD 1, the first control data area 3 (see FIG. 2) for recording the physical format information and the disk production information (disk control information) is composed of embossment. Hereupon, in the first control data area 3, other information has been previously recorded at a position into which the key information for deciphering the data is to be recorded, in order to protect literary properties from illegal copies thereof, namely to protect their copyrights.

4 denotes an optical pickup. The optical pickup 4 reproduces and records record signals of the DVD 1 using laser rays. 5 denotes a transfer controller. The transfer controller 5 moves the optical pickup 4 in the radial direction of the DVD 1 in order to record and reproduce the record signals at arbitrary positions on the DVD 1. 6 denotes a disk motor. The disk motor 6 rotates the DVD 1. 7 denotes a first control circuit. The first control circuit 7 controls the optical pickup 4, the transfer controller 5 and the disk motor 6. 8 denotes an amplifier. The amplifier 8 amplifies the signals, which have been read by the optical pickup 4. 9 denotes a second control circuit. The output signals of the amplifier 8 are inputted into the second control circuit 9. Based on the signals, the second control circuit 9 generates servo signals such as focus error signals, tracking error signals or the like, which are required when the optical pickup 4 reads the signals of the DVD 1, and then outputs them to the first control circuit 7. Although the signals, which are inputted into the second control circuit 9, are analog signals, the second control circuit 9 digitizes (makes binary) the analog signals.

10 denotes a demodulation circuit. The demodulation circuit 10 analyzes the signals, which have been read from the DVD 1 to be digitized, while it reconstructs the data such as the original image or music etc. 11 denotes a detecting circuit. The detecting circuit 11 detects an address signal or the like from the signals which are outputted from the second control circuit 9, and then outputs it to a system control circuit 12. The system control circuit 12 wholly controls the DVD recording/reproducing apparatus. 13 denotes a modulation circuit. The modulation circuit 13 modulates the record signals (signals or information to be recorded) and then outputs them to the amplifier 8 during the recording operation. The record signals are recorded into the writable DVD 1 using laser rays outputted from the optical pickup 4.

Hereinafter, actions of the DVD-R 1 and the recording/reproducing apparatus having the above-mentioned constructions will be described.

When the data is recorded into the DVD-R 1 provided with the main information area 2 and the first control data area 3, the first control circuit 7 drives and controls the transfer controller 5 in accordance with the instruction of the system control circuit 12, at first. As the result, the transfer controller 5 moves the optical pickup 4 into the first control data area 3 which is located at a position of the inner periphery side in the DVD 1. The signals, which have been read by the optical pickup 4, are amplified by the amplifier 8, and then digitized by the second control circuit 9. Then the demodulation circuit 10 reads the contents of the digitized signals as described above, and: then sends the results to the system control circuit 12. The system control circuit 12 identifies the disk on the basis of the physical format information and the disk production information (disk control information) each of which has been read from the first control data area 3, deciphers the recording condition or the like, and then shifts to the recording action.

The modulation circuit 13 modulates the ciphered record signals (record data). After the modulated record signals have been amplified by the amplifier 8, they are recorded into the main information area 2 of the DVD 1 using the laser rays outputted from the optical pickup 4. After the recording operation, the first control circuit 7 drives and controls the transfer controller 5 in accordance with the instruction of the system control circuit 12. As the result, the optical pickup 4 is moved to a position, which corresponds to the second control data area 15 located at further inner periphery side. Thus, the optical pickup 4 records predetermined information in the record signals (record data), for example the last address after recording operation etc. On that occasion, the physical format information and the disk production information of the first control data area 3 are recorded in addition to the above-mentioned information. Hereupon, the structures of the both areas 3,15 are made different from each other so as to be able to easily identify the first control data area 3 and the second control data area 15.

Hereinafter, there will be described actions in the case that the DVD-R 1 is reproduced by the recording/reproducing apparatus. In this case, the first control circuit 7 drives and controls the transfer controller 5 in accordance with the instruction of the system control circuit 12. As the result, the transfer controller 5 moves the optical pickup 4 to a position corresponding to the second control data area 15 (see FIG. 2). Then the optical pickup 4 reads the physical format information and the disk production information, each of which is recorded in the second control data area 15. On the basis of the information, the system control circuit 12 sends an instruction to the first control circuit 7. In accordance with the instruction of the system control circuit 12, the first control circuit 7 drives and controls the transfer controller 5. As the result, the transfer controller 5 moves the optical pickup 4 to a desired position in the main information area 2, and then the optical pickup 4 reads the record signals. (data information) of the DVD 1. Hereupon, when data is additionally written in the DVD 1 also, each of the physical format information and the disk production information is similarly read from the second control data area 15. Then the first control circuit 7 drives and controls the transfer controller 5 in accordance with the instruction of the system control circuit 12. As the result, the optical pickup 4 is moved to a predetermined position, and then the data is additionally written in the disk.

As for the first control data aera 3 and the second control data area 15 in the DVD-R 1, the information structures of the recorded data or the physical structures of the areas are different from each other. Hereupon, in the case that the information structures are made different from each other, the information may be recorded into the second control data area 15, with a structure including no key information, or the information may be recorded in such a manner that the arrangements of the physical format information and the disk production information are different from the arrangements of the first control data area 3. In consequence, the function for protecting the copyright can be strengthened, while it may become easily to identify the DVD-R 1 and the DVD-ROM (disk for only reproducing use).

On the other hand, in the case that the both control data areas 3,15 are made different from each other, the disk may be easily identified, if any one of the first control data area 3 and the second control data area 15 is designed to have a structure with inter-groove pits 17 or a structure having no wobble 18. In particular, if the first control data area 3 is designed to have a physical structure similar to that of the DVD-ROM (disk for only reproducing use) without the inter-groove pits 17 or wobble 18 while the second control data area 15 is designed to have an original physical structure of the DVD-R, the first control data area 3 can be formed of embossment. In consequence, the function for protecting the copyright in the non-recorded condition may be strengthened, and further its affinity for the apparatus for only reproducing use can be improved. Hereupon, if the physical structures are made different from each other, the line density, the width of the track, the physical depth of the it or the like may be changed.

As described above, each of the optical disk, the recording/reproducing apparatus of the optical disk and the recording method for the optical disk according to the present invention has a higher ability for protecting the copyright. In addition, the optical disk or the recording/reproducing apparatus may be easily operated with a good responsibility.

INDUSTRIAL APPLICABILITY

As described above, each or an optical disk, a recording/reproducing apparatus of the optical disk and a recording method of the optical disk according to the present invention, is useful as a means which can effectively prevent illegal copies of information recorded in the optical disk without spoiling the functions of the optical disk or the recording/reproducing apparatus at all, and particularly is suitable for using as a DVD or its recording/reproducing apparatus.

We claim:

1. A recordable optical disk, comprising:
    a main information area in which data information is recordable in a recording layer of a groove having a wobble such that said data information is readable using a light,
    a control data area located at an inner periphery side with respect to said main information area, and
    a sub information area,
    wherein in said control data area, other information including first physical format information has been previously recorded at a predetermined position instead of key information used to decipher the data information,
    said sub information area being configured to store second physical format information with an information structure which differs from an information structure of said control data area, and
    wherein said control data area comprises a pit area formed by an embossment.

2. The recordable optical disk of claim 1, wherein the different information structures comprise a different arrangement of physical format information.

3. The recordable optical disk of claim 1, wherein said previously recorded other information in the control data area is permanent.

4. The recordable optical disk of claim 1, wherein key information is not included in said sub information area.

5. The recordable optical disk of claim 1, wherein disk manufacturing information is recorded in said control data area and said sub information area.

6. The recordable optical disk of claim 5, wherein the arrangement of said disk manufacturing information and said physical format information differ in said control data area and said sub information area.

7. A recordable optical disk, comprising:

a main information area in which data information is recordable in a recording layer of a groove having a wobble such that said data information is readable using a light, a control data area located at an inner periphery side with respect to said main information area, and a sub information area, wherein in said control data area, other information including first physical format information has been previously recorded at a predetermined position, said predetermined position corresponding to an area on a read-only disk at which key information used to decipher the data information is recorded, and wherein in said sub information area, second physical format information is storable, an information structure of said sub information area being different from an information structure of said control data area, and wherein said control data area comprises a pit area formed by an embossment.

8. The recordable optical disk of claim 7, wherein the different information structures comprise a different arrangement of physical format information.

9. The recordable optical disk of claim 7, wherein said previously recorded other information in the control data area is permanent.

10. The recordable optical disk of claim 7, wherein key information is not included in said sub information area.

11. The recordable optical disk of claim 7, wherein disk manufacturing information is recorded in said control data area and said sub information area.

12. The recordable optical disk of claim 11, wherein the arrangement of said disk manufacturing information and said physical format information in said control data area is different from the arrangement of said disk manufacturing information and said physical format information in said sub information area.

* * * * *